J. Nonnenbacher,
Miter Machine.

N° 101,497.  Patented Apr. 5. 1870.

Witnesses:
Arthur Niece
Emile Moltz

Inventor:
John Nonnenbacher

United States Patent Office.

JOHN NONNENBACHER, OF NEW YORK, N. Y.

Letters Patent No. 101,497, dated April 5, 1870.

IMPROVEMENT IN MITER MACHINE.

The Schedule referred to in these Letters Patent and making part of the same.

I, JOHN NONNENBACHER, of the city, county, and State of New York, have invented certain Improvements in Miter Planing-Machines, of which the following is a specification.

As a picture-frame manufacturer, I have experienced much difficulty in making a good miter-joint, owing to the fact that after the cornice had been cut to the desired angle, the planing or fitting of the miter joint had to be done by hand, and not always with success. This fact suggested to me the necessity of the present device, which consists of a vertical plane, carrying two sets of planing-irons, said plane being made to slide up and down in ways attached to a frame-work, its intermittent movements being effected by means of a link-connection between the plane and an eccentric, which is operated by an intermediate gear and driving-pulley; and, also, of a plane-table, provided with cornice-guides, by means of which the ends of the pieces of cornice intended for the miter-joint or connection are accurately and nicely planed, and to any desired angle, whereby I am enabled to make a better miter-joint, and with less labor and expense than heretofore, as I will further explain by reference to the accompanying drawings, of which—

Figure 1:
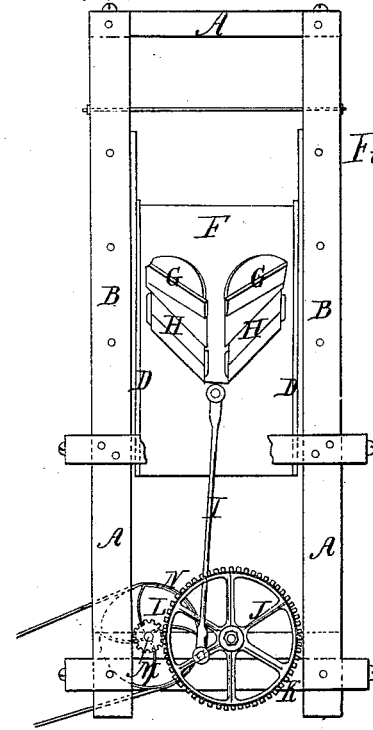

Figure 1 represents a rear elevation of the machine, showing plane-irons and operating mechanism.

Figure 2:
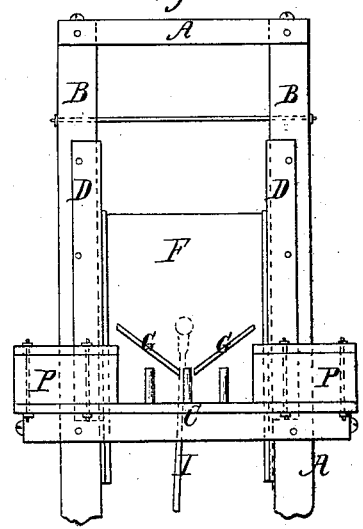

Figure 2, a front elevation of a portion of machine, showing planer and cornice-guides.

Figure 3:
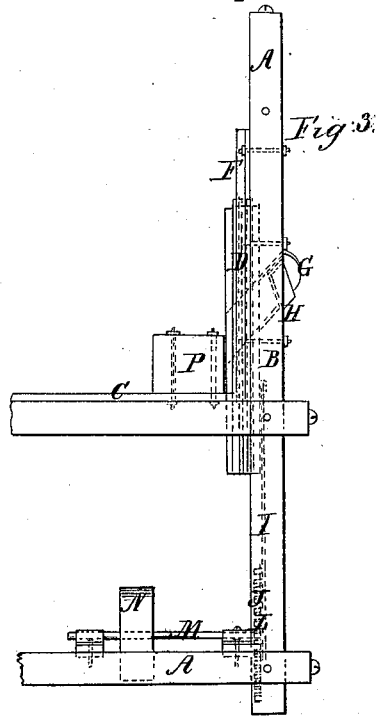

Figure 3, a side elevation.

Figure 4:
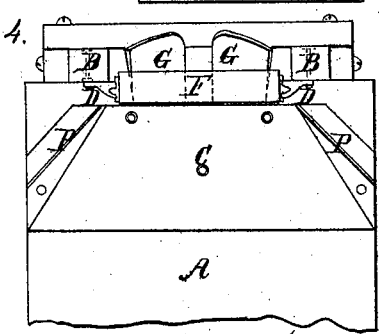

Figure 4, a horizontal section taken above table.

Figure 5:
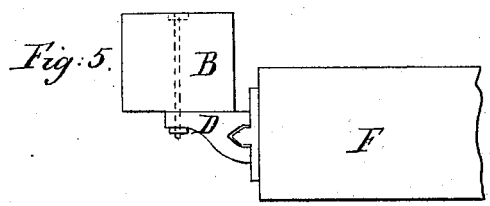

Figure 5, a horizontal section through a portion of plane, way, and frame-post on an enlarged scale.

In the said drawings—

A indicates the frame of the machine.

B B, the way-posts, and

C, the table.

D D are the ways, attached to the posts B B, and in which the plane F slides freely up and down.

This plane is provided with two plane-irons, G G, held in place by wedge-blocks H H in the usual manner, said plane-irons being set at an angle in relation to the ends of the cornice or molding to be planed, so as to make a drawing cut, (see fig. 2.)

I is the link connecting the plane with an eccentric, J, said eccentric forming a gear, K, on its periphery, which plays into a pinion, L, on the driving-shaft M, said shaft carrying a driving-pulley, N, by which the machine is operated.

C is the plane-table, provided with guides P P against which the pieces of cornice or molding to be planed are held or clamped, and when placed together said pieces make a good miter joint.

The guides are removable, and other guides may be substituted, as a right, acute, or obtuser angle miter is required.

What I claim is—

The plane F, ways D D, link I, eccentric J K, pinion L, pulley N, guides P P, and table C, constructed, arranged, and operating substantially as and for the purposes described and set forth.

In testimony whereof I have hereunto set my signature this 23d day of February, 1870.

JOHN NONNENBACHER.

Witnesses:
ARTHUR NEILL,
EMILE MOLTZ.